No. 86,700.                                                                    PATENTED FEB. 9, 1869.
E. W. SCOTT.
LIQUID MEASURING AND REGISTERING FAUCET.
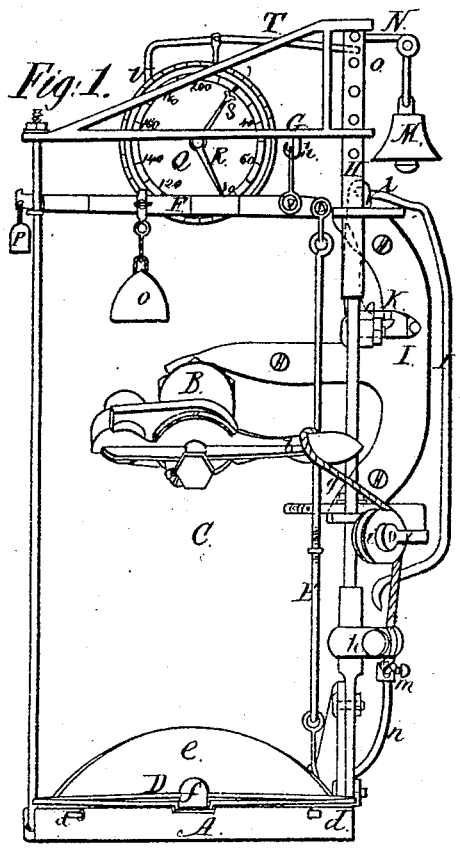
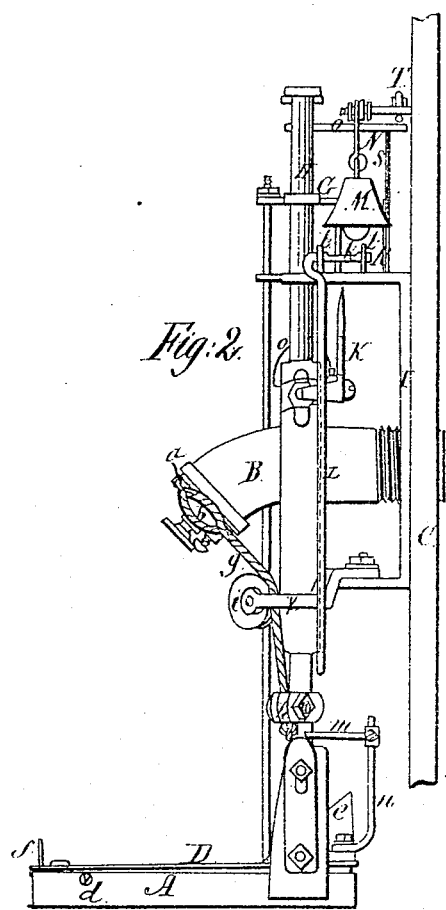
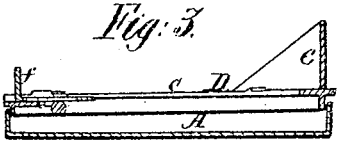
Witnesses:
Inventor:
Erastus W. Scott
by his attorney

ERASTUS W. SCOTT, OF WAUREGAN, CONNECTICUT.

Letters Patent No. 86,700, dated February 9, 1869.

IMPROVEMENT IN LIQUID-MEASURING AND REGISTERING FAUCETS.

The Schedule referred to in these Letters Patent and making part of the same.

*To all persons to whom these presents may come:*

Be it known that I, ERASTUS W. SCOTT, of Wauregan, of the county of Windham, and State of Connecticut, have invented a new and useful Automatic Apparatus for Measuring the Flowage of a Liquid from a Pipe or Faucet; and do hereby declare the same to be fully described in the following specification, and represented in the accompanying drawings, of which—

Figure 1 is a front elevation, and

Figure 2, a side view of it.

Figure 3 is a vertical section of the drip-pan, and the measure-supporting platform or annulus, to be hereinafter described.

The drawings exhibit the invention, as applied to the gate of a faucet.

The faucet is supposed to project from the head or other proper part of a barrel or hogshead, or from the side of a reservoir, to hold molasses or any other fluid, the purpose of the apparatus being to close the faucet on the instant any determinate quantity, as a quart, or a gallon, or any number of quarts or gallons, may have passed out of the faucet, and into a vessel placed on the supporting-annulus arranged below the faucet.

With my apparatus, a person, after having opened the gate of the faucet, need pay no further attention to it, for as soon as the required amount of liquid may have escaped from the faucet, the gate will be closed.

For grocers, liquor-dealers, and others, the invention will be found specially useful in the draught and measurement of molasses, oil, or any other liquid, as by means of it the time usually taken to watch the flowage of the liquid out of the faucet, and to close the faucet just at the right time to obtain the necessary amount of liquid, will be saved; and besides, the measurement of the liquid will be much more accurate, by my invention, than by the common mode of determining the same, as, with my invention, the measurement depends on the weight of the liquid, the faucet being closed at the instant, or immediately after, the weight due to the measure required may have passed the faucet.

In the drawings—

A denotes a shallow cylindrical vessel, which I term the "drip-pan," it being placed beneath the faucet B, which may be supposed to extend from one head, C, of a hogshead, such faucet being a "gate-faucet;" in other words, it has a gate, $a$, fixed to a lever, $b$.

An annular platform, D, (that is, a platform with an opening, $c$, through it, and with such opening so arranged that any drops of fluid, while descending from the faucet, shall fall through the drip-pan,) is pivoted, near its front part, to the pan A, that is, so as to be capable of turning up and down, the pivots, or knife-edge journals of the platform, being seen at $d\ d$.

A shoulder or lip, $e$, extends up from the rear part of the platform, and such platform, opposite to the middle of the shoulder, is furnished with an adjustable gauge, $f$, which, with the lip, serves to determine the proper position of the measuring-vessel, when placed on the platform and between them.

The said platform, by means of a connection, E, is suspended from the shorter arm of the lever of a common steelyard, F, hung upon a hook, $h$, extending from an arm, G, extended from a standard, H, which, at its foot, is attached to the drip-pan.

This standard is supported by, and so as to be capable of freely sliding vertically in a bracket, I, which is fastened to the head, C.

A rope, $g$, secured to an arm, $h'$, projected from the standard H, passes up and about a guide-wheel, $i$, and is secured to the lever of the faucet-gate, the said wheel being supported in and by an adjustable arm, $x$, projecting from the bracket.

A bent lever-catch, K, is also applied to the standard H.

This catch is to operate with a short curved shaft, $k$, provided with a lever, L, which extends down from such shaft in manner as represented in the drawings.

The shaft $k$ is arranged in bearings, $l\ l$, projecting upward from the top of the bracket.

On laying hold of the gate-lever of the faucet, and raising such lever upward, the standard H, with the drip-pan, the annular platform, and the steelyard, will be simultaneously elevated, until the catch K may hook upon the tripping-catch $k$.

In the meantime, an adjustable arm, $m$, supported by a standard, $n$, extending from the annular platform, will have been raised up against the lower part of the lever L, so as to hold such lever stationary against the tendency of it to move outward, such tendency being due to the leverage exerted on it by the curved shaft $k$, under the weight of the catch K, the standard H, the drip-pan, and the weighing-apparatus.

If we suppose a vessel or can to be placed on the annular platform, and such platform and can, when the movable weight $o$ of the steelyard is at the commencement of the scale for such steelyard to be counterbalanced by such weight, or by it and an auxiliary weight, $p$, hung on the end of the longer arm of the steelyard, and we open the gate of the faucet so as to simultaneously raise the drip-pan, the standard, and the weighing-apparatus, upward, the catch K will take upon the curved shaft $k$, and the arm $m$, by contact with the lever L, will estop the shaft from revolving, so as to throw off or discharge the catch.

The movable weight of the steelyard having been set to that notch of the beam which may indicate the weight of the quantity of liquid to be run into the can, as soon as the said quantity may be discharged into the can, the platform and can will descend, and, in descending, the platform will move the arm $m$ down below the lever L. The weight of the can and its liquid contents, combined with that of the drip-pan, the weighing-apparatus, and the standard H, will cause such parts to descend, and so act on the rope $g$ as to cause it to close the gate of the faucet, and thus cut off or stop the flowage of liquid from the faucet.

In order to give warning when this may take place, I employ an alarm, or bell, M, fixed to one arm of a swinging bent lever, N, whose fulcrum is projected from the head, C.

A pin, O, extended from the standard H, is arranged so as to come in contact with and pass the horizontal arm of the lever N, during a descent of the standard, and thereby put the bell in vibration.

I also employ, with the measuring-apparatus described, a registering-apparatus, or clock, the dial and hands of which are exhibited at Q R S.

This registering-apparatus is to determine the number of gallons, or other units of measure, that from time to time may be discharged from the hogshead.

To the case of the said registering-apparatus I apply a spring-lever, T, connected with a pawl, U, which should extend into the case and operate a ratchet on the driving-shaft of the train of gears used to actuate the hands R S.

The lever T extends over the pin O, so that, every time the pin is raised upward, it may strike against the lever and raise it and the pawl, the latter, on the descent of the pin, being carried down by the reaction of the spring of the lever.

While the longer hand and its dial-circle of divisions will serve to indicate quarts, up to forty, or ten gallons, the shorter hand and its circle of divisions may indicate an increased number, such as twenty, thirty, forty, and fifty, and so on up, say, to two hundred gallons.

Any skilled clock-maker will readily understand how to arrange and construct a train of gears to effect the proper movements of either or both the hands of the registering-clock.

The registering-apparatus and its spring-lever may be applied to the weighing-platform, by means of a rope or line extending up from the platform, and fastened to the lever, and extended from thence over a pulley, and connected with a weight sufficient to nearly counterbalance the platform, the can, and the amount of liquid (as a gallon, for instance) to be drawn into such can. Under these circumstances, on the amount being run into the can, the platform will descend, and, by drawing on the line, will pull down the lever and the pawl, and operate the register-train.

In this way, and without the steelyard, we can register the amounts drawn from time to time from the faucet; but with the steelyard we have the means of obtaining fractional portions of the unit of measure, that is to say, we can measure any divided fractional part of a quart, or one or more quarts, or any fractional part of a quart, the registering-apparatus continuing to indicate the whole amount from time to time drawn out of the hogshead.

It will be easy to see that the equivalent for the balance-weight, the cord and pulley, is found in the steelyard-beam and its weight, and other parts hereinbefore described, as connected either directly or indirectly with the platform, the steelyard, however, affording another or additional advantage, as hereinbefore stated.

I am aware of the subjects of the United States Patents, No. 5,970, dated December 19, 1848, and No. 67,319, dated July 30, 1867, and make no claim thereto, or to any devices or combination of devices set forth in either of such patents. I specially make no claim to the combination of the faucet, or movable scale or platform, or steelyard and weight, and a tripping-mechanism, as arranged and constructed, and made to operate as described in the last-mentioned patent.

What I do claim as my invention, is as follows:

1. I claim the combination of the registering-apparatus with the movable platform, the steelyard and weight, and the tripping-mechanism, and faucet, arranged and applied together substantially in manner and so as to operate as specified.

2. I also claim the combination of the alarm, the registering-apparatus, the movable platform, the steelyard and weight, the tripping-mechanism, and the faucet, the whole being substantially as and for the purpose described.

ERASTUS W. SCOTT.

Witnesses:
R. H. EDDY,
SAMUEL N. PIPER.